(No Model.)

J. V. HARTER.
SEED DRILL.

No. 351,698. Patented Oct. 26, 1886.

WITNESSES
N. W. Mortimer
N. C. Lammond

INVENTOR
Joseph V. Harter
By David Mead.
Attorney

United States Patent Office.

JOSEPH V. HARTER, OF DENVER, ILLINOIS.

SEED-DRILL.

SPECIFICATION forming part of Letters Patent No. 351,698, dated October 26, 1886.

Application filed March 27, 1885. Serial No. 160,304. (No model.)

*To all whom it may concern:*

Be it known that I, JOSEPH V. HARTER, a citizen of the United States, residing at Denver, Illinois, have invented new and useful Improvements in Seed-Drills, of which the following is a specification.

My invention relates to certain new and useful improvements in wheat-drills.

The object of the invention is to provide a wheat-drill having a number of attachments, which will render it possible to sow wheat in a field which has been previously reaped of a crop, leaving the stubble standing, without plowing, harrowing, rolling, &c., and in that way turning the stubble under, it being desirable to leave the stubble standing, so as to form a means for holding a protecting covering of snow.

With this object in view my invention consists, primarily, of a drill-tooth provided with an attachment of peculiar and novel construction, by which a channel is formed in the ground for the reception of the grain; and the invention further consists of cutting-disks carried in front of the said tooth, for the purpose of mellowing the earth for its passage, and a wheel which presses the grain into the ground.

In order that those skilled in the art to which my invention appertains may know how to make and use the same, I will now proceed to particularly describe it in connection with the accompanying drawings, in which—

Figure 1:
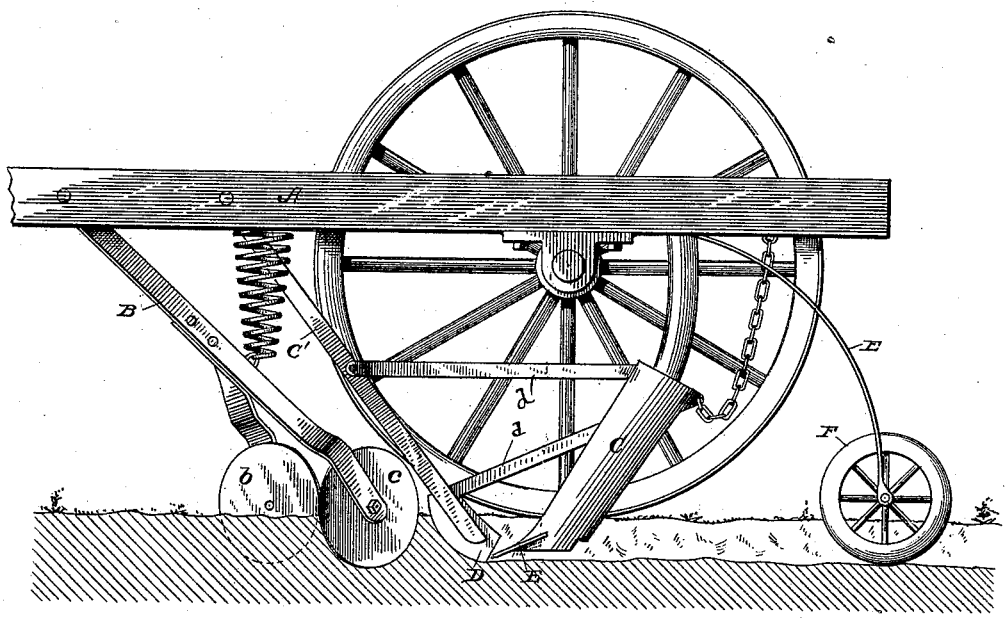
Figure 2:
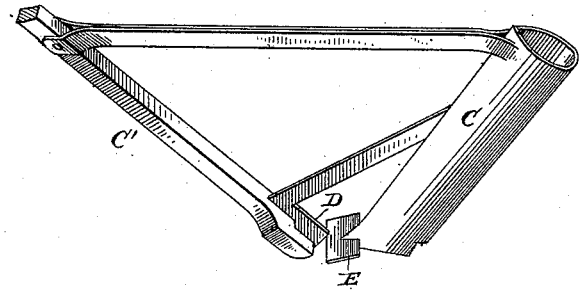

Figure 1 represents a side view of one section of a drill made in accordance with my invention, and Fig. 2 represents a detail view of the tooth and its attachment.

In the drawings, A represents a beam, one of which is provided for each drill-tooth, and is secured to the main frame of the drill in any suitable manner.

B represents a depending arm, which carries two metal disks, $b\ c$, which are arranged to cut into the ground as the drill passes along. The function of these disks is to cut a shallow stratum of the earth into small particles, so that a channel may be easily made by the drill-tooth. In order that this function may be successfully carried out, the disks are mounted in such a manner as to bring them at angles to each other and to the line of draft, so that the greatest possible reduction may be accomplished.

The drill-teeth C are hollow, as usually made, and are provided with a frame consisting of a slanting bar, $c'$, and cross-pieces $d\ d$, which latter secure the bar to the teeth. The lower end of the bar $c'$ is provided with two projecting arms or runners, which ride over the surface of the ground, and between these runners is secured the blade D, which cuts into the ground a suitable depth for the purpose of softening it and adapting it to be scooped up by the shovel E, which is secured to the front of the tooth. This shovel E is an inclined plate of metal, which extends into the ground about as far as the cutter D and scoops out a channel, into which the grain is dropped, and the soil thus removed is disposed upon the sides of this channel by coming into contact with the front face of the shoe, which is in the form of a wedge, coming almost to a point in front and gradually widening toward the rear.

The grain is dropped into the channel formed as above described through the hollow shoe, and is pressed into the ground by the wheel F, which is mounted in a depending arm secured to the beam. The wheels $b$ and $c$ are held to their work by a spring, which bears upon the arm at one end and against the beam at the other, and is of a strength to be overcome to allow the wheels to rise should they come into contact with a hard substance, which would otherwise injure it.

Having thus described my invention, what I claim, and desire to secure by Letters Patent, is—

1. In a seed-drill, the combination, with the bar A, of the cutting-disks mounted at an angle to each other and to the line of draft, the drill-tooth provided with the shovel, and the wheel mounted in rear of the tooth, all substantially as described.

2. In a seed-drill, the combination, with the beam A, of the cutting-disks, arranged as described, the drill-tooth provided with the frame carrying the cutter, and also provided with the shovel, and the wheel mounted in rear of the shoe.

In testimony whereof I have hereunto set my hand in the presence of two subscribing witnesses.

JOSEPH V. HARTER.

Witnesses:
JOSHUA V. SCOTT,
THOS. C. WRISTEN.